US012091033B2

(12) United States Patent
Kakimoto et al.

(10) Patent No.: US 12,091,033 B2
(45) Date of Patent: Sep. 17, 2024

(54) INFORMATION PROVISION SYSTEM, INFORMATION PROVISION METHOD, AND STORAGE MEDIUM

(71) Applicant: HONDA MOTOR CO., LTD., Tokyo (JP)

(72) Inventors: Takaya Kakimoto, Tokyo (JP); Shogo Tatsumi, Tokyo (JP); Akiyuki Suzuki, Tokyo (JP); Shogo Nishida, Tokyo (JP); Takashi Sato, Tokyo (JP); Takayuki Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 17/902,016

(22) Filed: Sep. 2, 2022

(65) Prior Publication Data

US 2022/0410920 A1   Dec. 29, 2022

Related U.S. Application Data

(63) Continuation of application No. PCT/JP2021/007402, filed on Feb. 26, 2021.

(30) Foreign Application Priority Data

Mar. 9, 2020 (JP) .................................. 2020-039905

(51) Int. Cl.
*B60W 50/14* (2020.01)
*B60W 40/076* (2012.01)

(52) U.S. Cl.
CPC .......... *B60W 50/14* (2013.01); *B60W 40/076* (2013.01); *B60W 2050/143* (2013.01);
(Continued)

(58) Field of Classification Search
CPC .............. B60W 50/14; B60W 40/076; B60W 2556/10; B60W 2552/15;
(Continued)

(56) References Cited

U.S. PATENT DOCUMENTS 8,849,474 B2   9/2014   Yoneta et al.
9,245,395 B2   1/2016   Morishima et al.
(Continued)

FOREIGN PATENT DOCUMENTS

CN   202275517 U   6/2012
CN   102686476 A   9/2012
(Continued)

OTHER PUBLICATIONS

International Search and Written Opinion for PCT/JP2021/007402 mailed Apr. 27, 2021. (partially translated).
(Continued)

*Primary Examiner* — Kam Wan Ma
(74) *Attorney, Agent, or Firm* — Thomas | Horstemeyer, LLP

(57) ABSTRACT

The present invention provides an information provision system that provides information to a driver of a straddle type vehicle, the system comprising: an acquisition unit configured to acquire information on a course of the straddle type vehicle; a specification unit configured to specify an attention portion to which attention of the driver should be paid in the course acquired by the acquisition unit; and a notification unit configured to notify the driver of the attention portion specified by the specification unit, wherein the specification unit is configured to specify the attention portion based on inclination information indicating an inclination on the course of a reference vehicle that has previously traveled on the course, and specify the attention portion based on a difference in a travel route on the course
(Continued)

between the straddle type vehicle and a four-wheeled vehicle as the reference vehicles.

10 Claims, 8 Drawing Sheets

(52) U.S. Cl.
CPC ... *B60W 2050/146* (2013.01); *B60W 2300/36* (2013.01); *B60W 2520/14* (2013.01); *B60W 2552/15* (2020.02); *B60W 2556/10* (2020.02)

(58) Field of Classification Search
CPC ..... B60W 2050/143; B60W 2050/146; B60W 2300/36; B60W 2520/14
See application file for complete search history.

(56) References Cited

U.S. PATENT DOCUMENTS

| | | | |
|---|---|---|---|
| 9,489,843 B2 | 11/2016 | Sato et al. | |
| 9,666,066 B2 | 5/2017 | Hiramatsu et al. | |
| 10,283,007 B2* | 5/2019 | Kurosawa | G09B 9/058 |
| 11,358,670 B2 | 6/2022 | Keiichiro | |
| 11,618,522 B2 | 4/2023 | Moerbe | |
| 2012/0259479 A1 | 10/2012 | Yoneta et al. | |
| 2014/0198933 A1* | 7/2014 | Totsuka | G06V 20/56 381/302 |
| 2014/0358329 A1 | 12/2014 | Morishima et al. | |
| 2015/0057914 A1 | 2/2015 | Hiramatsu et al. | |
| 2016/0049075 A1 | 2/2016 | Sato et al. | |
| 2020/0070920 A1 | 3/2020 | Keiichiro | |
| 2020/0148294 A1 | 5/2020 | Moerbe | |
| 2020/0238999 A1* | 7/2020 | Batts | G08G 1/0112 |

FOREIGN PATENT DOCUMENTS

| | | |
|---|---|---|
| CN | 104205186 A | 12/2014 |
| CN | 105799824 A | 7/2016 |
| CN | 106161621 A | 11/2016 |
| CN | 206322324 U | 7/2017 |
| CN | 107045791 A | 8/2017 |
| CN | 108313173 A | 7/2018 |
| CN | 110740913 A | 1/2020 |
| DE | 102012201802 A1 | 8/2013 |
| DE | 102015200584 A1 | 7/2016 |
| EP | 1679673 A1 | 7/2006 |
| EP | 3031707 A2 | 6/2016 |
| EP | 3048025 A1 | 7/2016 |
| JP | WO2005038747 A1 | 11/2007 |
| JP | 2012-160126 A | 8/2012 |
| JP | 2014-191774 A | 10/2014 |
| JP | 2015-018409 A | 1/2015 |
| JP | 2018-060299 A | 4/2018 |
| JP | 2018-151730 A | 9/2018 |
| WO | 2018/179392 A1 | 10/2018 |
| WO | 2018/193322 A1 | 10/2018 |
| WO | 2021/182137 A1 | 9/2021 |

OTHER PUBLICATIONS

Chinese Office Action for Chinese Patent Application No. 202180018111.3 mailed Jun. 1, 2023 (partially translated).

* cited by examiner

FIG. 3

| DETECTION ITEM | DATA TO BE USED FOR DETECTION |
|---|---|
| SUDDEN BRAKING | POSITION INFORMATION, VELOCITY INFORMATION, ABS OPERATION INFORMATION |
| HAZARD AVOIDANCE BEHAVIOR | POSITION INFORMATION, INCLINATION INFORMATION |
| FALLING | POSITION INFORMATION, INCLINATION INFORMATION |
| LOW μ ROAD | POSITION INFORMATION, ABS OPERATION INFORMATION |

INFORMATION PROVISION SYSTEM, INFORMATION PROVISION METHOD, AND STORAGE MEDIUM

CROSS-REFERENCE TO RELATED APPLICATIONS

This application is a continuation of International Patent Application No. PCT/JP2021/007402 filed on Feb. 26, 2021, which claims priority to and the benefit of Japanese Patent Application No. 2020-039905 filed on Mar. 9, 2020 the entire disclosures of which are incorporated herein by reference.

BACKGROUND OF THE INVENTION

Field of the Invention

The present invention relates to an information provision system, an information provision method, and a storage medium that provide information to a driver of a straddle type vehicle.

Description of the Related Art

Japanese Patent Laid-Open No. 2014-191774 discloses that traveling information including a location where sudden braking occurs is acquired from a plurality of vehicles, and a map indicating the location where sudden braking occurs as a dangerous location is provided to a user.

In a straddle type vehicle such as a two-wheeled vehicle, a road environment affecting traveling may be different from that for a four-wheeled vehicle. For example, in the road environment, there may be structures and situations such as a manhole and a hole (unevenness) in a road, which have a small influence on the four-wheeled vehicle and have a large influence on the straddle type vehicle. Thus, it is not sufficient to notify the driver of the straddle type vehicle of a portion where sudden braking occurs as described in Japanese Patent Laid-Open No. 2014-191774 as a portion to which attention should be paid.

SUMMARY OF THE INVENTION

The present invention provides, for example, a driver with information suitable for a straddle type vehicle regarding a road environment.

According to the present invention, there is provided an information provision system that provides information to a driver of a straddle type vehicle, the information provision system comprising: an acquisition unit configured to acquire information on a course of the straddle type vehicle; a specification unit configured to specify an attention portion to which attention of the driver should be paid in the course acquired by the acquisition unit; and a notification unit configured to notify the driver of the attention portion specified by the specification unit, wherein the specification unit is configured to specify the attention portion based on inclination information indicating an inclination on the course of a reference vehicle that has previously traveled on the course, and specify the attention portion based on a difference in a travel route on the course between the straddle type vehicle and a four-wheeled vehicle as the reference vehicles.

Further features of the present invention will become apparent from the following description of exemplary embodiments with reference to the attached drawings.

BRIEF DESCRIPTION OF THE DRAWINGS

FIG. 3 is a correspondence diagram between an event occurring in a vehicle and information used for detection of the event.

DESCRIPTION OF EMBODIMENTS

Figure 1:
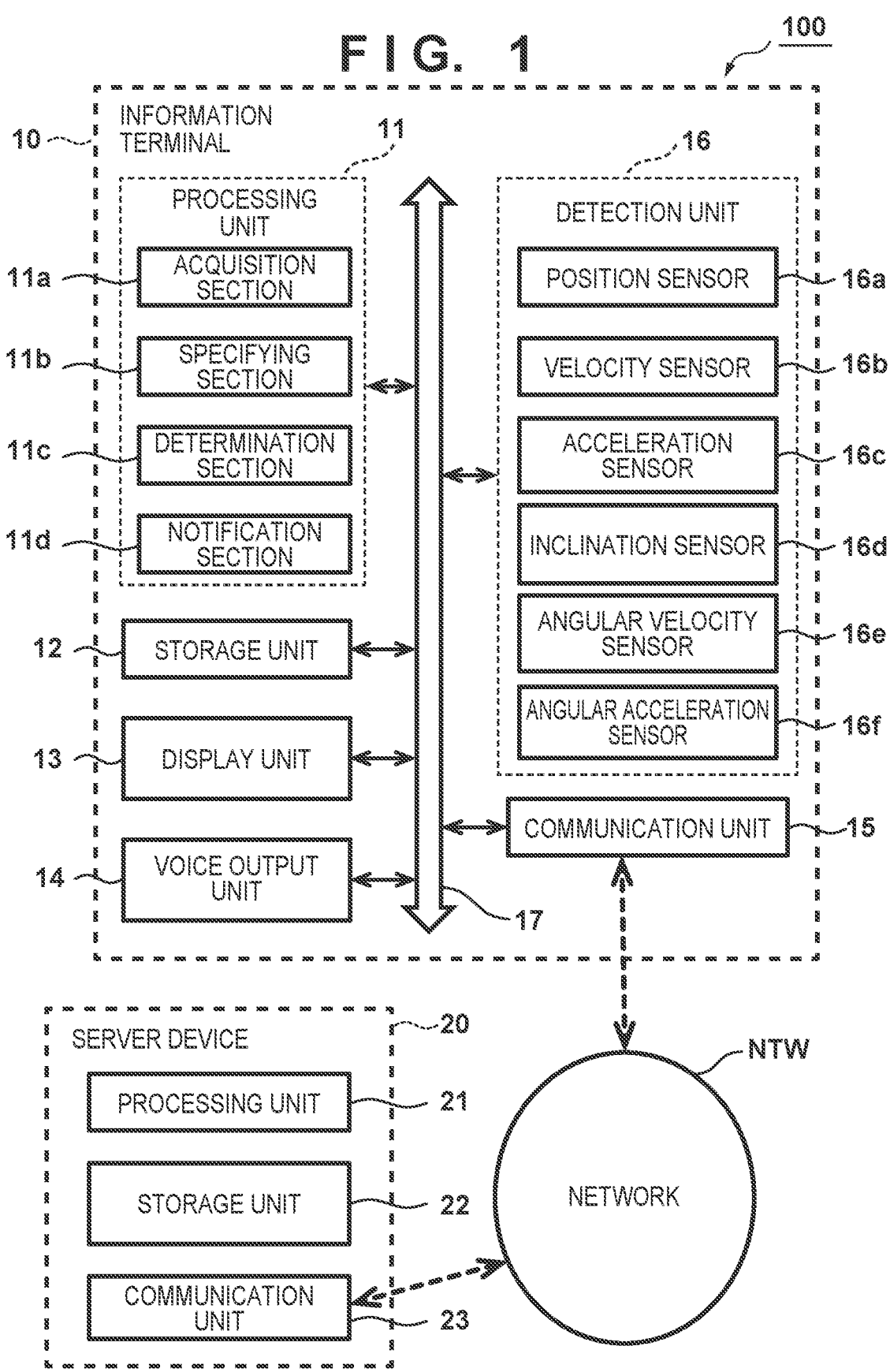
FIG. 1 is a block diagram illustrating a configuration of an information provision system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

[System Configuration]

Hereinafter, a first embodiment according to the present invention will be described. FIG. 1 is a block diagram illustrating a configuration of an information provision system 100 of the present embodiment. The information provision system 100 of the present embodiment can include, for example, an information terminal 10 and a server device (information management server) 20 communicably connected to each other via a network NTW. Here, each configuration of FIG. 1 described below can be a computer that implements the present invention according to a program.

Figure 2:
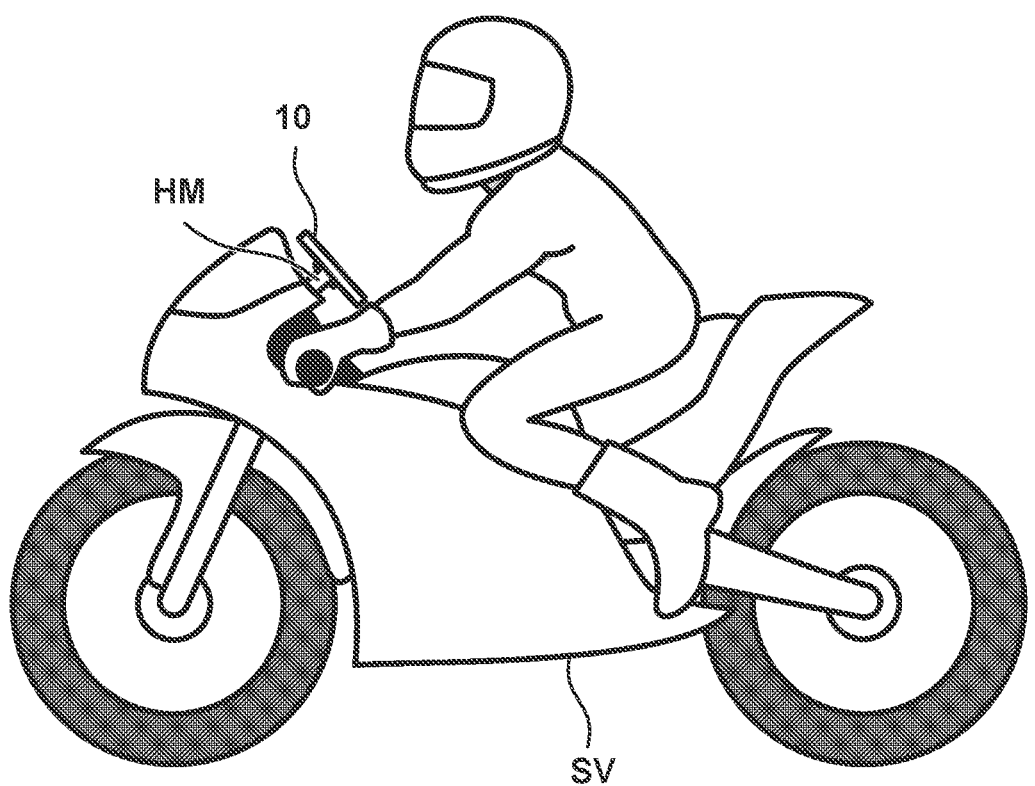
FIG. 2 is a diagram illustrating an example in which an information terminal is mounted on a straddle type vehicle.

First, a configuration of the information terminal 10 will be described. The information terminal 10 may be configured as an in-vehicle device attached (fixed) to a straddle type vehicle, and may be configured as a mobile terminal in the present embodiment. The mobile terminal is, for example, a device having various functions in addition to a call function, such as a smartphone or a tablet terminal that has been widely spread in recent years, and can be configured to be attachable to and detachable from a straddle type vehicle SV by a dedicated holding mechanism HM, for example, as illustrated in FIG. 2. FIG. 2 illustrates an example in which the information terminal 10 as the mobile terminal is mounted on the straddle type vehicle SV using the dedicated holding mechanism HM. The straddle type vehicle SV on which the information terminal 10 of the present embodiment is mounted may be a motorcycle or another type of straddle type vehicle such as a bicycle or a three-wheeled vehicle.

The information terminal 10 of the present embodiment may include, for example, a processing unit 11, a storage unit 12, a display unit 13, a voice output unit 14, a communication unit 15, and a detection unit 16. The units of the information terminal 10 are communicably connected with each other via a system bus 17.

The processing unit 11 may include a processor represented by a CPU, a storage device such as a semiconductor memory, an interface of an external device, and the like. The storage unit 12 stores a program to be executed by the processor, data to be used for processing by the processor, and the like. The processing unit 11 can read the program stored in the storage unit 12 to a storage device such as a memory and execute the program. In the present embodiment, the storage unit 12 stores an application program (hereinafter, may be referred to as an "information provision program") for providing a driver of the straddle type vehicle with information regarding an attention location, and the processing unit 11 can read the information provision program stored in the storage unit 12 to a storage device such as a memory and execute the information provision program.

The processing unit 11 of the present embodiment includes, for example, an acquisition section 11a, a specifying section 11b, a determination section 11c, and a notification section 11d. The acquisition section 11a acquires information on a course (planned travel route) of the straddle type vehicle SV. The specifying section 11b specifies an attention portion to which attention of the driver of the straddle type vehicle SV should be paid in the course of the straddle type vehicle SV acquired by the acquisition section. The determination section 11c determines a degree of influence on the straddle type vehicle SV at the attention portion specified by the specifying section 11b. The notification section 11d notifies the driver of the straddle type vehicle SV of the attention portion specified by the specifying section 11b via the display unit 13 and/or the voice output unit 14.

The display unit 13 may include a display that notifies the driver of information by displaying an image. In the present embodiment, the display unit 13 (display) includes, for example, a touch-panel type LCD (Liquid Crystal Display) and the like, and therefore has not only a function of displaying an image but also a function as an input unit that accepts input of information from the driver. Alternatively, the display unit 13 (display) may have only the function of displaying an image, and an input unit (for example, a keypad) may be provided independently of the display unit 13. The voice output unit 14 may include a speaker that outputs voice toward a periphery of the information terminal 10.

The communication unit 15 is communicably connected with the server device 20 via the network NTW. Specifically, the communication unit 15 has a function as a transmission unit that transmits information to the server device 20 via the network NTW, and a function as a reception unit that receives information from the server device 20 via the network NTW.

The detection unit 16 can include, for example, a position sensor 16a, a velocity sensor 16b, an acceleration sensor 16c, an inclination sensor 16d, an angular velocity sensor 16e, and an angular acceleration sensor 16f The position sensor 16a includes, for example, a GPS sensor, and detects a current position of the information terminal 10 as a current position of the straddle type vehicle SV. The velocity sensor 16b detects a velocity of the information terminal 10 as a velocity of the straddle type vehicle SV. The acceleration sensor 16c detects an acceleration of the information terminal 10 as an acceleration of the straddle type vehicle SV The inclination sensor 16d detects an inclination of the information terminal 10 as an inclination (bank angle) of the straddle type vehicle SV. The angular velocity sensor 16e detects an angular velocity of the information terminal 10 as an angular velocity (for example, yaw axis angular velocity) of the straddle type vehicle SV. The angular acceleration sensor 16f detects an angular acceleration of the information terminal 10 as an angular acceleration (for example, yaw axis angular acceleration) of the straddle type vehicle SV. The inclination sensor 16d, the angular velocity sensor 16e, and the angular acceleration sensor 16f can be configured by, for example, a gyro sensor.

Here, the information terminal 10 of the present embodiment is configured to detect the position data, velocity data, acceleration data, inclination data (bank angle data), angular velocity data, and angular acceleration data of the straddle type vehicle SV by the respective sensors of the detection unit 16, but the present invention is not limited thereto. For example, the information terminal 10 may be configured to acquire each data of the straddle type vehicle SV, detected by an internal sensor of the straddle type vehicle SV, using wireless communication using Bluetooth (registered trademark) and the like, wired communication using a cable and the like, or the like.

Next, the configuration of the server device 20 will be described. The server device 20 can include a processing unit 21, a storage unit 22 (database), and a communication unit 23. The processing unit 21 includes a processor represented by a CPU, a storage device such as a semiconductor memory, an interface with an external device, and the like. The storage unit 22 stores a program to be executed by the processor, data to be used for processing by the processor, and the like. The processing unit 21 can read the program stored in the storage unit 22 to a storage device such as a memory and execute the program. The communication unit 23 is communicably connected to the information terminal 10 via the network NTW. Specifically, the communication unit 23 has a function as a reception unit that receives information from the information terminal 10 via the network NTW, and a function as a transmission unit that transmits information to the information terminal 10 via the network NTW.

In the present embodiment, the server device 20 (storage unit 22) stores travel state information acquired from each of a plurality of vehicles. The travel state information is information acquired during traveling by a sensor and the like in each vehicle, and may include, for example, position information, velocity information, inclination information, and ABS operation information associated with each other over time. The position information is information indicating the position of each vehicle, and may include the position data. The velocity information is information indicating the velocity and acceleration of each vehicle, and may include at least one of the velocity data and the acceleration data. The inclination information is information indicating the inclination of each vehicle, and may include at least one of the inclination data, the angular velocity data, and the angular acceleration data. The ABS operation information is information indicating that an ABS (Antilock Brake System) is operated. Here, the plurality of vehicles from which the travel state information is acquired are not limited to motorcycles, and may include straddle type vehicles such as a bicycle and a three-wheeled vehicle, and four-wheeled vehicles.

By using such travel state information, it is possible to specify a portion (place) where each vehicle has suddenly broken, has performed hazard avoidance behavior, has fallen, and has performed other behaviors, and/or a portion (place) which is a low μ road. As an example, as illustrated in FIG. 3, a portion where each vehicle has suddenly broken can be specified from the position information, the velocity information, the ABS operation information, and the like acquired from each vehicle. The portion where each vehicle has performed the hazard avoidance behavior or has fallen can be specified from the position information, the inclination information, and the like acquired from each vehicle. The portion of the low μ road can be specified from the position information, the ABS operation information, and the like acquired from each vehicle.

[Processing in Information Terminal]

Figure 4:
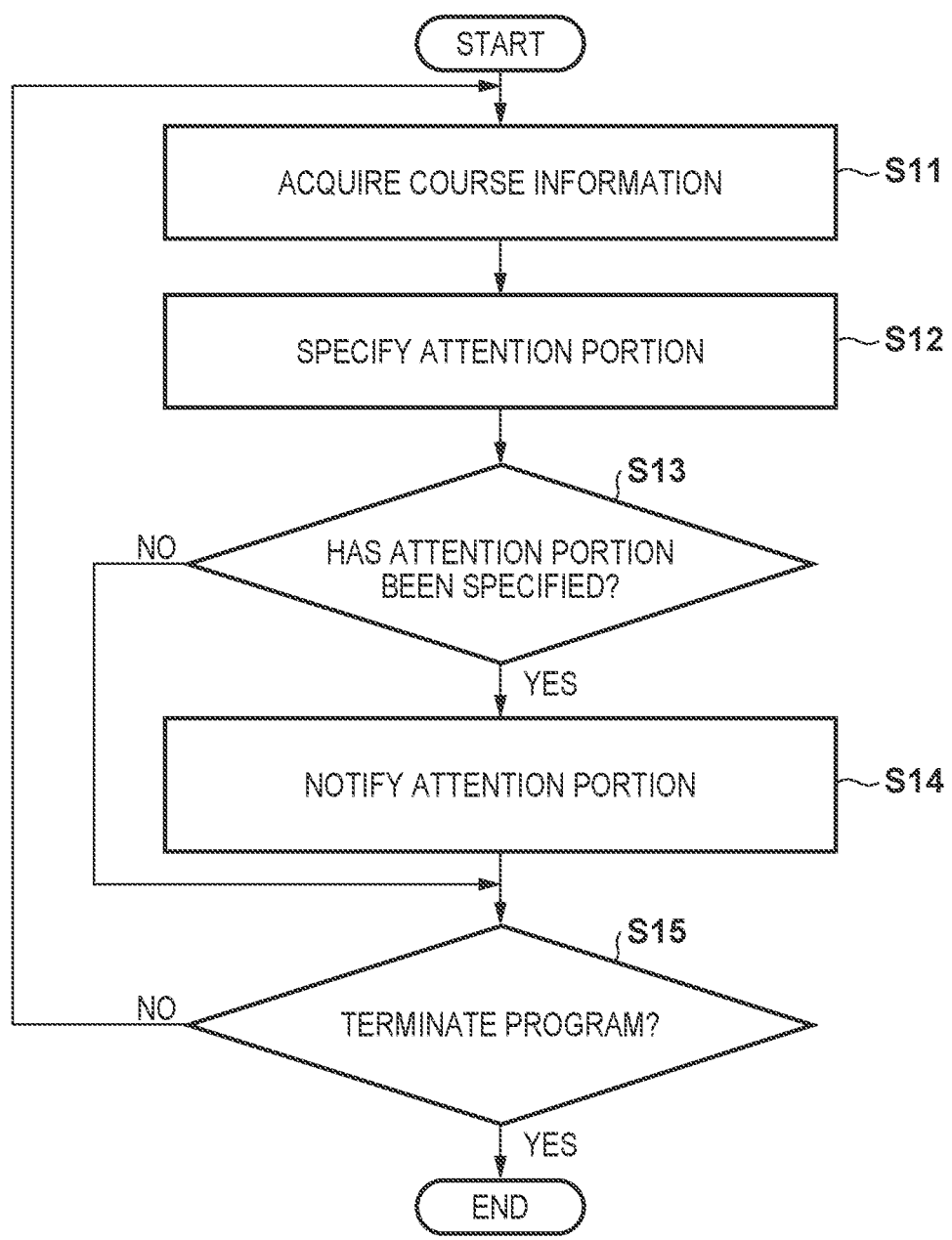
FIG. 4 is a flowchart illustrating processing when an information provision program is executed.

Next, processing to be performed by the information terminal 10 when the information provision program is executed will be described. FIG. 4 is a flowchart illustrating processing to be performed by the processing unit 11 of the information terminal 10 when the information provision program is executed.

In S11, the processing unit 11 (acquisition section 11a) acquires course information on the course (planned travel route) of the straddle type vehicle SV. For example, the acquisition section 11a transmits destination information received from the driver and current position information detected by the position sensor 16a to the server device 20. The server device 20 (processing unit 21) that has received the destination information and the current position information calculates (determines) information indicating the planned travel route from the current position of the straddle type vehicle SV to the destination as course information based on map information stored in the storage unit 22. As a result, the acquisition section 11a can acquire the course information from the server device 20. Here, in the present embodiment, the course information is calculated by the processing unit 21 of the server device 20, but the present invention is not limited thereto, and the course information may be calculated by the processing unit 11 of the information terminal 10.

In S12, the processing unit 11 (specifying section 11b) specifies the attention portion to which attention of the driver should be paid in the course of the straddle type vehicle SV acquired in S11. As described above, in the road environment, there may be structures and situations such as a manhole and a hole (unevenness) on a road, which have a small influence on the four-wheeled vehicle and have a large influence on the straddle type vehicle. Thus, the processing unit 11 (specifying section 11b) of the present embodiment specifies, as the attention portion, a portion having a small influence on the four-wheeled vehicle and a large influence on the straddle type vehicle based on the travel state information of the vehicle that has previously traveled on the course of the straddle type vehicle SV acquired in S11. Specific processing for specifying the attention portion will be described later.

Here, in S12, the processing unit 11 (specifying section 11b) may specify an attention portion to which attention should be paid in common between the straddle type vehicle (two-wheeled vehicle) and the four-wheeled vehicle, such as the portion where sudden braking is performed or the portion of the low μ road. As described above, such a common attention portion can be specified based on, for example, the velocity information and/or the ABS operation information on the course of the vehicle that has previously traveled on the course of the straddle type vehicle SV acquired in S11. Hereinafter, the vehicle that has previously traveled on the course of the straddle type vehicle SV acquired in S11 may be referred to as a "reference vehicle".

In S13, the processing unit 11 determines whether the attention portion has been specified in S12 or not. When the attention portion is specified in S12, the processing proceeds to S14, and when the attention portion is not specified in S12, the processing proceeds to S15.

In S14, the processing unit 11 (notification section 11d) notifies the driver of the attention portion specified in S12. The notification of the attention portion may be performed by superimposing and displaying the attention portion using a symbol or the like on the course (planned travel route) of the straddle type vehicle SV displayed on the display unit 13 (display), or may be performed by outputting voice from the voice output unit 14. In the notification of the attention portion, for example, all the attention portions may be notified before the straddle type vehicle SV starts traveling, or the notification may be performed for each attention portion to which the straddle type vehicle SV traveling is approaching. As an example of the latter case, the processing unit 11 (notification section 11d) may notify the driver of the attention portion at which a distance to the straddle type vehicle SV is equal to or less than a predetermined value among the plurality of attention portions specified in S12. Here, in the present embodiment, the example in which the attention portion specified in S12 is notified to the driver of the straddle type vehicle SV has been described, but the present invention is not limited thereto, and for example, the attention portion may be notified to the driver of the four-wheeled vehicle who has approached the attention portion.

In S15, the processing unit 11 determines whether to terminate the information provision program. For example, the processing unit 11 can determine to end the information provision program when the straddle type vehicle SV arrives at the destination, when an instruction to end the program is received from the driver, when a power button of the information terminal 10 is pressed by the driver, or in other cases. When it is determined to end the information provision program, the program is ended, and when it is determined not to end the information provision program, the process returns to S11.

[Processing of Specifying Attention Portion]

Figure 5:
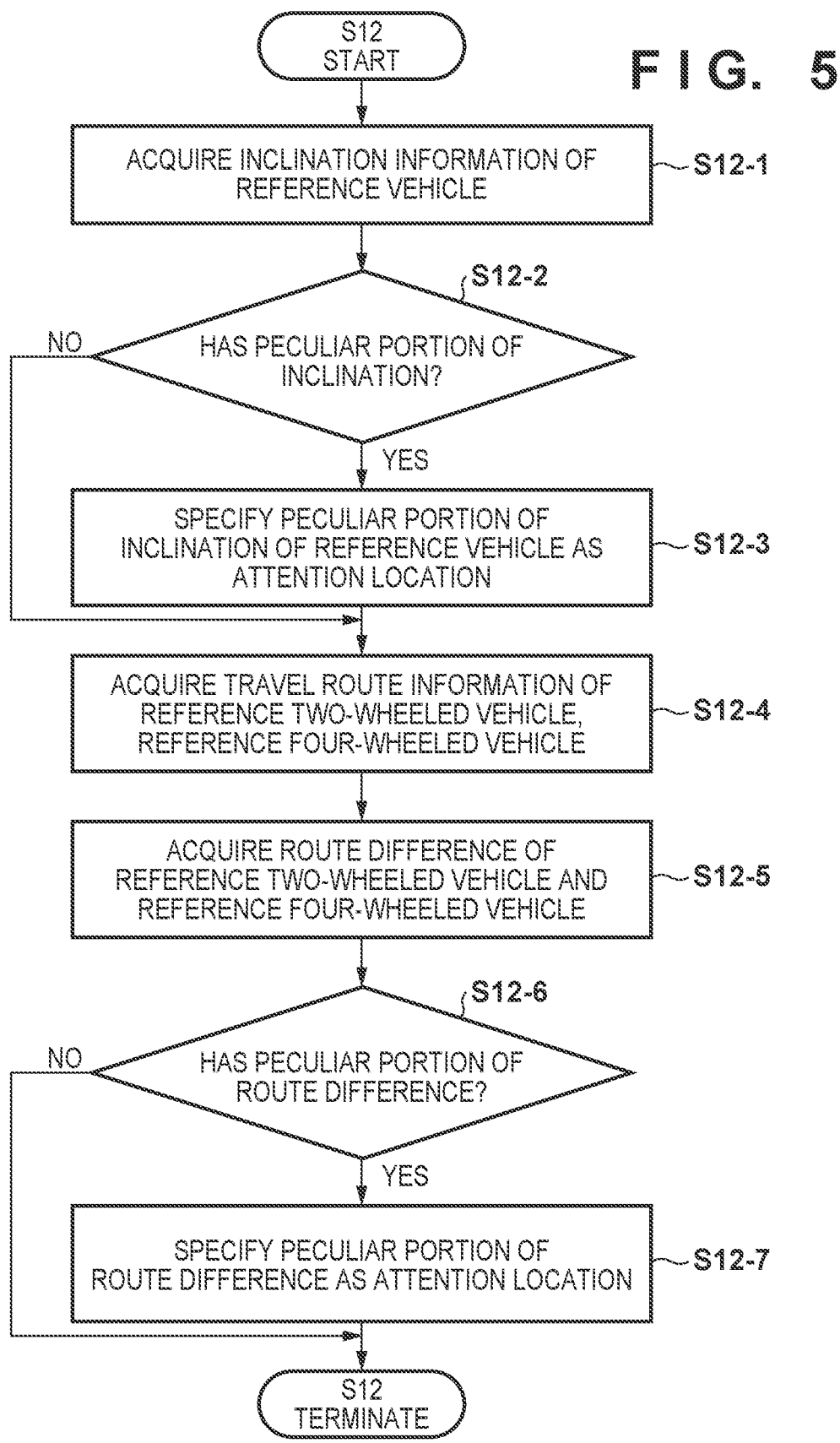
FIG. 5 is a flowchart illustrating processing of specifying an attention portion.

Next, processing of specifying the attention portion (S12) will be described. FIG. 5 is a flowchart illustrating the processing of specifying the attention portion performed in Step S12.

S12-1 to S12-3 are steps of specifying the attention portion based on the inclination information obtained from the reference vehicle. In S12-1, the specifying section 11b (processing unit 11) acquires the inclination information of the reference vehicle on the course of the straddle type vehicle SV acquired in S11 from the server device 20. As the reference vehicle from which the inclination information is acquired in this step, the straddle type vehicle can be selected. As described above, the inclination information may include the inclination data (bank angle data), the angular velocity data, the angular acceleration data, and the like. In this step, in the course of the straddle type vehicle SV acquired in S11, the inclination information of the reference vehicle different for each part may be acquired, or the inclination information of the plurality of reference vehicles may be acquired for the same part in the course. In the latter case, the inclination information of the plurality of reference vehicles acquired in this step can be averaged and used in the following step.

In S12-2, the specifying section 11b determines whether or not there is a peculiar portion where the inclination of the reference vehicle is peculiar in the inclination information of the reference vehicle acquired in S12-1. When it is determined that there is the peculiar portion in the inclination information of the reference vehicle, the processing proceeds to S12-3, and when it is determined that there is no peculiar portion, the processing proceeds to S12-4. In S12-3, the specifying section 11b specifies the peculiar portion of the inclination of the reference vehicle determined in S12-2 as the attention portion.

Figure 6A:
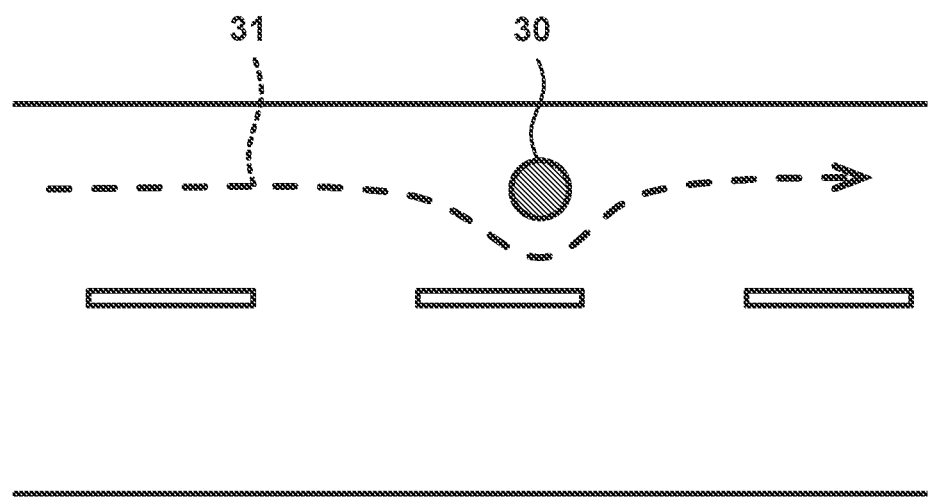
FIG. 6A is a diagram illustrating an example of inclination information of a reference vehicle.
Figure 6B:
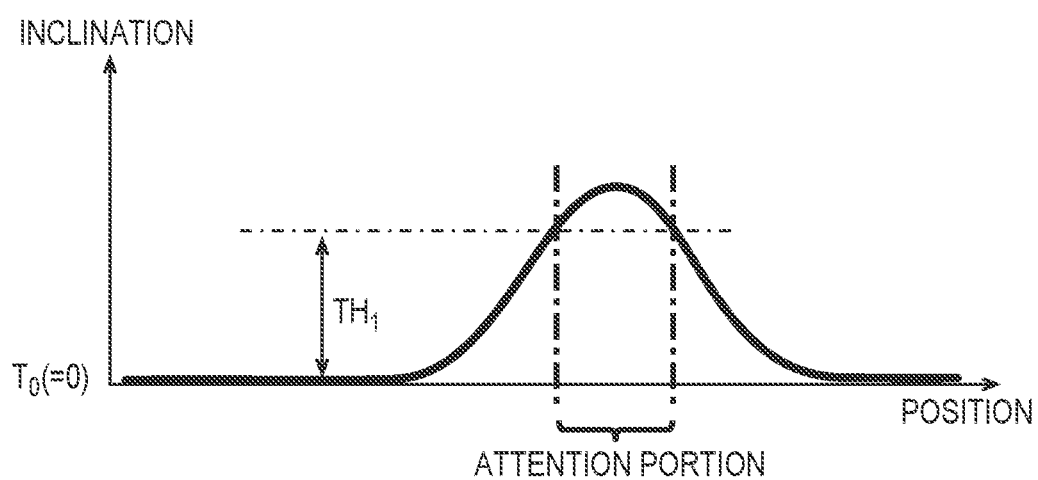
FIG. 6B is a diagram illustrating an example of the inclination information of the reference vehicle.
Figure 7A:
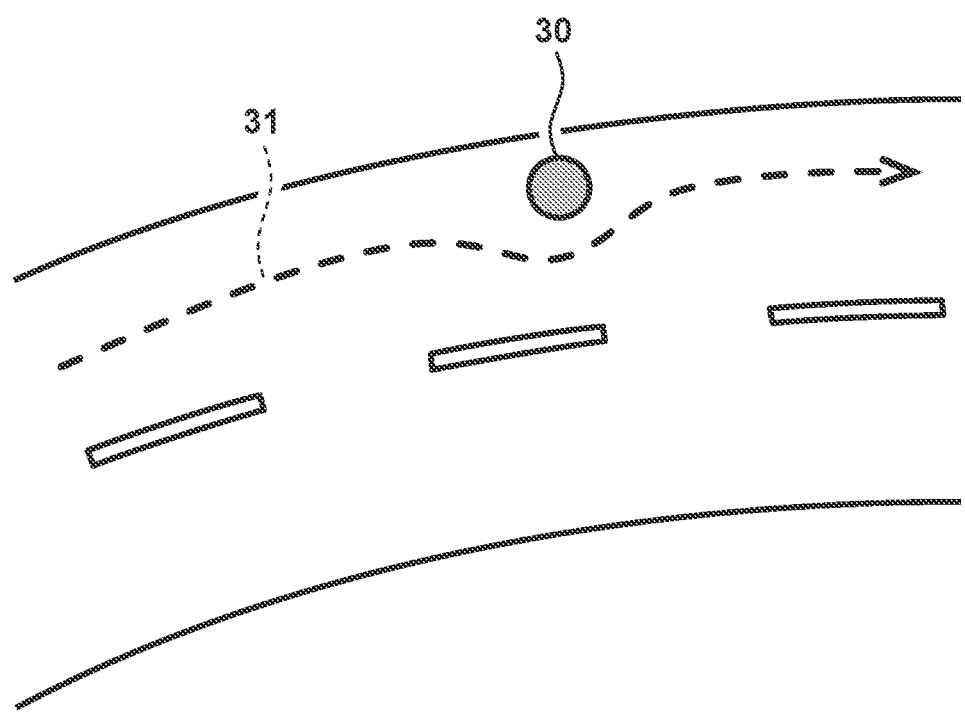
FIG. 7A is a diagram illustrating an example of the inclination information of the reference vehicle.
Figure 7B:
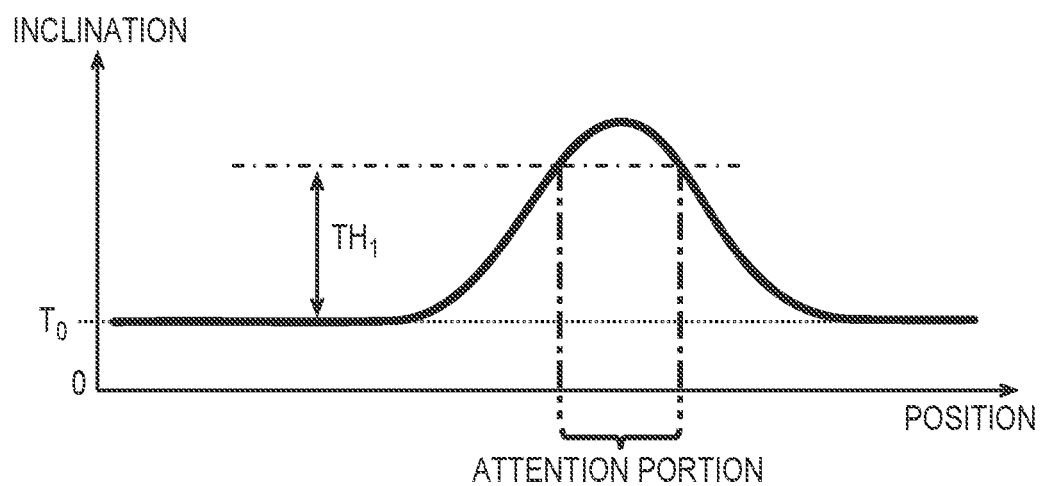
FIG. 7B is a diagram illustrating an example of the inclination information of the reference vehicle.

For example, the specifying section 11b can specify, as the attention portion (peculiar portion), a portion where the inclination of the reference vehicle temporarily (partially) changes or a portion where the inclination of the reference vehicle shows an abnormal tendency in the inclination data over time included in the inclination information of the reference vehicle. FIGS. 6A to 6B and FIGS. 7A to 7B are diagrams illustrating an example of specifying the attention portion from the inclination information (inclination data over time) of the reference vehicle that has previously traveled on the course of the straddle type vehicle SV. FIGS. 6A to 6B illustrate an example of specifying the attention portion from the inclination information of the reference vehicle on a straight road as a part of the course, and FIGS. 7A to 7B illustrate an example of specifying the attention portion from the inclination information of the reference vehicle on a curve as a part of the course. FIGS. 6A and 7A illustrate a travel route 31 of the reference vehicle on a road where an obstacle 30 such as a manhole or unevenness exists, and FIGS. 6B and 7B illustrate the inclination data of the reference vehicle on the road.

As in the travel route 31 illustrated in FIGS. 6A and 7A, the reference vehicle is traveling on the road so as to avoid the obstacle 30, and in this case, as shown in FIGS. 6B and 7B, the inclination of the reference vehicle temporarily changes (increases) when the obstacle 30 is avoided. The specifying section 11b can specify a portion where the inclination of the reference vehicle has temporarily changed in this manner as the attention portion (peculiar portion). As specific processing, the specifying section 11b obtains a proper inclination T0 of the reference vehicle on the course based on a road shape (for example, a curvature of the road) of the course, thereby specifying, as the attention portion (peculiar portion), a portion where a difference between the actual inclination of the reference vehicle and the proper inclination T0 is equal to or more than a predetermined value (equal to or more than a threshold value TH1). Here, FIGS. 6A to 6B and FIGS. 7A to 7B illustrate the example in which the inclination of the reference vehicle temporarily increases; however, even when the inclination of the reference vehicle temporarily decreases, the attention portion can be specified using similar processing.

S12-4 to S12-7 are steps of identifying the attention portion based on a difference in the travel route between the straddle type vehicle as the reference vehicle and the four-wheeled vehicle. The travel route information of the reference vehicle can be acquired based on the position information (for example, position data over time) obtained from the reference vehicle.

In S12-4, the specifying section 11b acquires the travel route information of the reference vehicle on the course of the straddle type vehicle SV acquired in S11 from the server device 20. As the reference vehicle from which the travel route information is acquired in this step, the straddle type vehicle and the four-wheeled vehicle can be selected. Hereinafter, the straddle type vehicle as the reference vehicle may be referred to as a "reference two-wheeled vehicle", and the four-wheeled vehicle as the reference vehicle may be referred to as a "reference four-wheeled vehicle". The travel route information can be obtained based on the position information (position data over time) as described above. Here, in this step, at least one travel route information of the reference two-wheeled vehicle and at least one travel route information of the reference four-wheeled vehicle are acquired in each portion of the course of the straddle type vehicle SV acquired in S11. If this condition is satisfied, the travel route information of the reference vehicle different for each part may be used in the course, or the travel route information of the plurality of reference vehicles may be used for the same part in the course. In the latter case, the travel route information of the plurality of reference vehicles acquired in this step can be averaged and used in the following step.

In S12-5, the specifying section 11b obtains a route difference between the travel route of the reference two-wheeled vehicle and the travel route of the reference four-wheeled vehicle acquired in S12-4. In S12-6, the specifying section 11b determines whether or not there is a peculiar portion in the route difference obtained in S12-5. When it is determined that there is the peculiar portion, the processing proceeds to S12-7, and when it is determined that there is no peculiar portion, Step S12 is ended.

Figure 8A:
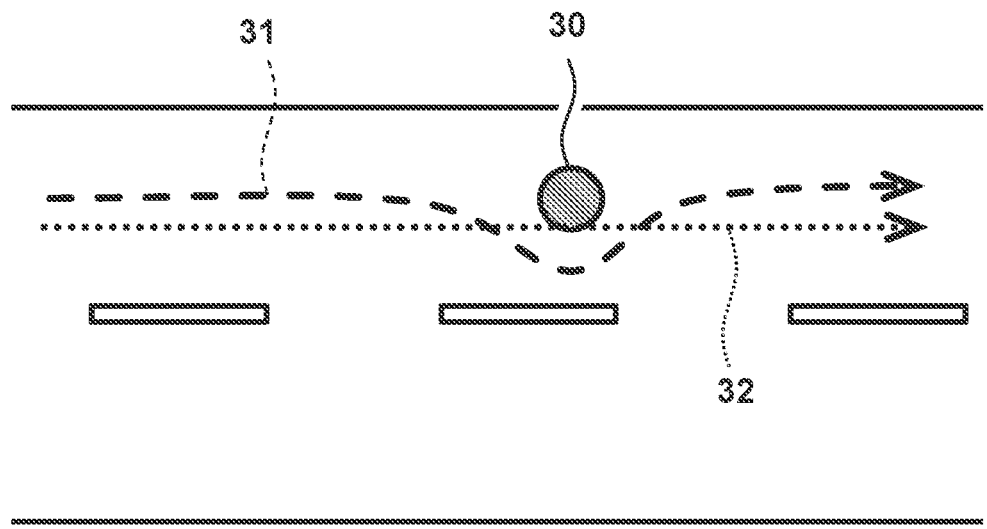
FIG. 8A is a diagram illustrating an example of travel route information of the reference vehicle.
Figure 8B:
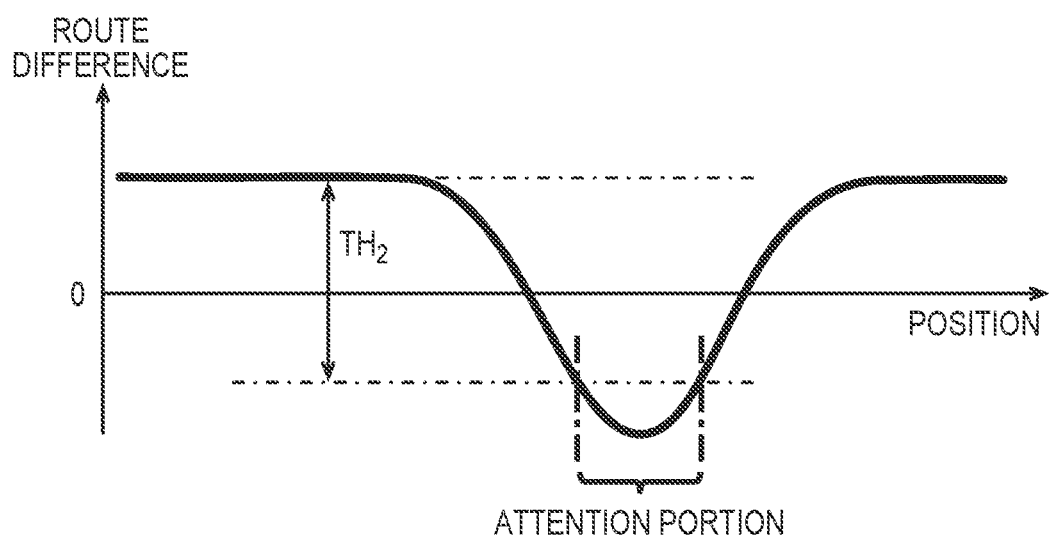
FIG. 8B is a diagram illustrating an example of the travel route information of the reference vehicle.

For example, the specifying section 11b can specify a portion where the route difference obtained in S12-5 temporarily (partially) changes and a portion showing an abnormal tendency as the attention portions (peculiar portions). FIGS. 8A to 8B are diagrams illustrating an example of identifying the attention portion from the travel route information (position data over time) on the course of the reference vehicle (reference two-wheeled vehicle, reference four-wheeled vehicle) that has previously traveled on the course of the straddle type vehicle SV. FIG. 8A illustrates the travel route 31 of the reference two-wheeled vehicle and a travel route 32 of the reference four-wheeled vehicle on the road where an obstacle 30 such as a manhole or unevenness exists, and FIG. 8B illustrates a route difference between the reference two-wheeled vehicle and the reference four-wheeled vehicle on the road.

In FIG. 8A, the reference two-wheeled vehicle shows the travel route 31 that avoids the obstacle 30, whereas the reference four-wheeled vehicle shows the straight travel route 32 regardless of the presence of the obstacle 30. In this case, as shown in FIG. 8B, a portion where the route difference between the travel route 31 of the reference two-wheeled vehicle and the travel route 32 of the reference four-wheeled vehicle has temporarily changed is generated by the operation for avoiding the obstacle 30 in the reference two-wheeled vehicle, and therefore, this portion can be specified as the attention portion (peculiar portion). As specific processing, the specifying section 11b can specify a portion where a change amount of the route difference is equal to or more than a predetermined value (equal to or more than a threshold value TH2) as the attention portion (peculiar portion).

As described above, in the present embodiment, the attention portion to which attention of the driver should be paid is specified based on the inclination information and/or the travel route information of the reference vehicle that has previously traveled on the course of the straddle type vehicle SV. As a result, it is possible to notify the driver of the straddle type vehicle SV of the portion having a small influence on the four-wheeled vehicle and having a large influence on the straddle type vehicle SV, that is, the portion requiring particular attention for the straddle type vehicle SV. Therefore, information useful for the straddle type vehicle SV can be suitably notified to the driver. In addition, by using the inclination information of the reference vehicle that has previously traveled, it is possible to improve accuracy of specifying the portion requiring particular attention for the straddle type vehicle SV.

Second Embodiment

Hereinafter, a second embodiment according to the present invention will be described. The present embodiment basically follows the first embodiment. In the present embodiment, in Step S14 of the flowchart illustrated in FIG. 4, the processing unit 11 (determination section 11c) determines the degree of influence on the straddle type vehicle SV at the attention portion specified in S12. Then, the processing unit 11 (notification section 11d) changes a notification mode according to the degree of influence on the straddle type vehicle SV determined by the determination section 11c.

For example, the determination section 11c can determine that the greater the difference between the actual inclination and the proper inclination T0 of the reference vehicle illustrated in FIGS. 6A to 6B and FIGS. 7A to 7B and/or the greater the route difference illustrated in FIGS. 8A to 8B, the greater the degree of influence on the straddle type vehicle SV at the attention portion. The notification section 11d can change the color and size of the display of the attention portion in the display unit 13 according to the degree of influence determined by the determination section 11c. As an example, the notification section 11d may change the display (notification mode) of the attention portion such that the greater the degree of influence determined by the determination section 11c, the greater recognition (attention degree) of the attention portion by the driver. As a result, it is possible to cause the driver to reliably recognize the attention portion having a relatively high degree of influence on the straddle type vehicle SV and to reduce the bother of frequently notifying the attention portion having a relatively low degree of influence on the straddle type vehicle SV.

The invention is not limited to the foregoing embodiments, and various variations/changes are possible within the spirit of the invention.

Summary of Embodiments

1. An information provision system of the above embodiments is an information provision system (100) that provides information to a driver of a straddle type vehicle (SV), the information provision system characterized by comprising:
acquisition means (11a) for acquiring information on a course of the straddle type vehicle;
specification means (11b) for specifying an attention portion to which attention of the driver should be paid in the course acquired by the acquisition means; and
notification means (11d) for notifying the driver of the attention portion specified by the specification means, wherein the specification means specifies the attention portion based on inclination information indicating an inclination on the course of a reference vehicle that has previously traveled on the course.

According to this embodiment, it is possible to notify the driver of the straddle type vehicle of a portion having a small influence on the four-wheeled vehicle and having a large influence on the straddle type vehicle, that is, a portion requiring particular attention for the straddle type vehicle. Therefore, information useful for the straddle type vehicle can be suitably notified to the driver. In addition, by using the inclination information of the reference vehicle that has previously traveled, it is possible to improve accuracy of specifying the portion requiring particular attention for the straddle type vehicle.

2. In the information provision system of the above embodiment,
the specification means specifies, as the attention portion, a peculiar portion where the inclination of the reference vehicle is peculiar in the inclination information.

According to this embodiment, it is possible to accurately specify the portion requiring particular attention for the straddle type vehicle based on the inclination information of the reference vehicle.

3. In the information provision system of the above embodiment,
the specification means obtains a proper inclination of the reference vehicle on the course based on a road shape of the course, and specifies, as the attention portion, a portion where a difference between the inclination of the reference vehicle and the proper inclination in the inclination information is equal to or more than a predetermined value.

According to this embodiment, by obtaining the proper inclination according to the road shape, it is possible to suitably determine a portion where the inclination of the reference vehicle is abnormal (peculiar) and to accurately specify the portion requiring particular attention for the straddle type vehicle.

4. In the information provision system of the above embodiment,
the inclination information includes at least one of inclination data, angular velocity data, and angular acceleration data of the reference vehicle.

According to this embodiment, suitable data can be used as the inclination information of the reference vehicle.

5. In the information provision system of the above embodiment,
the specification means specifies the attention portion based on a difference in a travel route on the course between the straddle type vehicle and a four-wheeled vehicle as the reference vehicles.

According to this embodiment, by using the travel route of the four-wheeled vehicle as the reference vehicle as a reference, it is possible to suitably determine a portion where the travel route of the straddle type vehicle as the reference vehicle is abnormal (peculiar) and to accurately specify the portion requiring particular attention for the straddle type vehicle.

6. An information provision system of the above embodiments is an information provision system (100) that provides information to a driver of a straddle type vehicle (SV) or a four-wheeled vehicle, the information provision system characterized by comprising:
acquisition means (11a) for acquiring information on a course of the straddle type vehicle or the four-wheeled vehicle;
specification means (11b) for specifying an attention portion to which attention of the driver should be paid in the course acquired by the acquisition means; and
notification means (11d) for notifying the driver of the attention portion specified by the specification means,
wherein the specification means specifies the attention portion based on a difference in a travel route on the course between the straddle type vehicle and the four-wheeled vehicle as reference vehicles that have previously traveled on the course.

According to this embodiment, by using the difference between the travel route of the four-wheeled vehicle as the reference vehicle and the travel route of the straddle type vehicle as the reference vehicle, it is possible to notify the driver of the portion requiring particular attention for the straddle type vehicle or the four-wheeled vehicle.

7. In the information provision system of the above embodiment, the specification means specifies, as the attention portion, a portion where a change amount of the difference is equal to or more than a predetermined value.

According to this embodiment, it is possible to accurately specify the portion requiring particular attention for the straddle type vehicle (or the four-wheeled vehicle) based on a route difference between the straddle type vehicle as the reference vehicle and the four-wheeled vehicle.

8. In the information provision system of the above embodiment, the system further comprises determination means (11c) for determining a degree of influence on the straddle type vehicle at the attention portion specified by the specification means, wherein the notification means changes a notification mode according to the degree of influence determined by the determination means.

According to this embodiment, it is possible to cause the driver to reliably recognize a portion having a relatively high degree of influence on the straddle type vehicle and to reduce the bother of frequently notifying a portion having a relatively low degree of influence on the straddle type vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information provision system that provides information to a driver of a straddle type vehicle, the information provision system comprising a processor configured to:
   acquire information on a course of the straddle type vehicle;
   specify an attention portion to which attention of the driver should be paid in the acquired course; and
   notify the driver of the specified attention portion,
   wherein the processor is configured to specify the attention portion based on inclination information indicating an inclination on the course of a reference straddle type vehicle that has previously traveled on the course, and specify the attention portion based on a difference between a travel route on the course previously traveled by the reference straddle type vehicle and a travel route on the course previously traveled by a four-wheeled vehicle.

2. The information provision system according to claim 1, wherein the processor is configured to specify, as the attention portion, a peculiar portion where the inclination of the reference straddle type vehicle is peculiar in the inclination information.

3. The information provision system according to claim 1, wherein the processor is configured to obtain a proper inclination of the reference straddle type vehicle on the course based on a road shape of the course, and specify, as the attention portion, a portion where a difference between the inclination of the reference straddle type vehicle in the inclination information and the obtained proper inclination is equal to or more than a predetermined value.

4. The information provision system according to claim 1, wherein the inclination information includes at least one of inclination data, angular velocity data, and angular acceleration data of the reference straddle type vehicle.

5. An information provision system that provides information to a driver of a straddle type vehicle or a four-wheeled vehicle, the information provision system comprising a processor configured to:
   acquire information on a course of the straddle type vehicle or the four-wheeled vehicle;
   specify an attention portion to which attention of the driver should be paid in the acquired course; and
   notify the driver of the specified attention portion,
   wherein the processor is configured to specify the attention portion based on a difference in a travel route on the course between the straddle type vehicle and the four-wheeled vehicle as reference vehicles that have previously traveled on the course.

6. The information provision system according to claim 1, wherein the processor is configured to specify, as the attention portion, a portion where a change amount of the difference is equal to or more than a predetermined value.

7. The information provision system according to claim 1, wherein the processor is configured to determine a degree of influence on the straddle type vehicle at the specified attention portion, and
   change a notification mode according to the determined degree of influence.

8. A non-transitory computer-readable storage medium storing a program for causing a computer to function as an information provision system according to claim 1.

9. An information provision method of providing information to a driver of a straddle type vehicle by a processor of an information terminal, the information provision method comprising:
   acquiring information on a course of the straddle type vehicle;
   specifying an attention portion to which attention of the driver should be paid in the acquired course; and
   notifying the driver of the specified attention portion,
   wherein the attention portion is specified based on inclination information indicating an inclination on the course of a reference straddle type vehicle that has previously traveled on the course, and the attention portion is specified based on a difference between a travel route on the course previously traveled by the reference straddle type vehicle and a travel route on the course previously traveled by a four-wheeled vehicle.

10. An information provision method of providing information to a driver of a straddle type vehicle or a four-wheeled vehicle by a processor of an information terminal, the information provision method comprising:
    acquiring information on a course of the straddle type vehicle or the four-wheeled vehicle;
    specifying an attention portion to which attention of the driver should be paid in the acquired course; and
    notifying the driver of the specified attention portion,
    wherein the attention portion is specified based on a difference in a travel route on the course between the straddle type vehicle and the four-wheeled vehicle as reference vehicles that have previously traveled on the course.

* * * * *